March 27, 1928.

I. J. REMARK

DIE HEAD

Filed April 30, 1927

1,663,732

INVENTOR
Isidore J. Remark
BY Evans & McCoy
ATTORNEYS

Patented Mar. 27, 1928.

1,663,732

UNITED STATES PATENT OFFICE.

ISIDORE J. REMARK, OF AKRON, OHIO, ASSIGNOR TO THE GENERAL TIRE & RUBBER COMPANY, OF AKRON, OHIO, A CORPORATION OF OHIO.

DIE HEAD.

Application filed April 30, 1927. Serial No. 187,734.

This invention relates to die heads for depositing extruded material on a member traveling through the die head and particularly for insulating wire with rubber compositions and the like.

One of the objects of the invention is to provide an improved form of die head that is inexpensive to manufacture, that is readily adjustable to give different sizes of die openings, and that is readily threaded with the wire to be insulated.

Extruding dies for insulating wire and the like have heretofore been proposed in which the wire entered the die head through one hardened metal eyelet and left the die head after passing transversely thereacross through the forming die. According to this invention the wire or other member to be covered through the use of the die enters and leaves the die head and die openings that are formed in the same member and that are therefore always in proper alignment with each other and that are furthermore so arranged that different sized die openings and eyelets may be brought to operative position by rotation of the member in its assembled position through the loosening only of the nuts holding it in place.

An illustrative application of the invention is shown in the accompanying drawings wherein.

Figure 1:
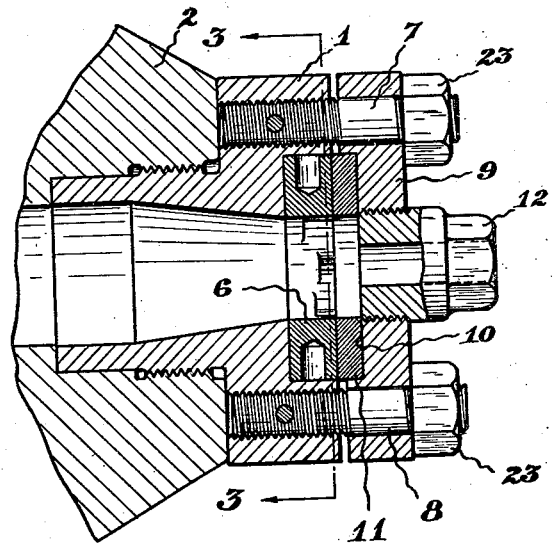
Figure 1 is a transverse, sectional view through an assembled die head made in accordance with the invention, the view being taken substantially on line 1—1 of Fig. 2.
Figure 2:
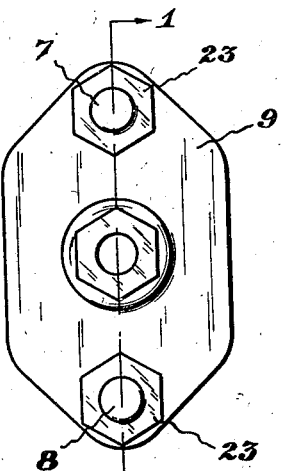
Fig. 2 is a front elevational view of the die head shown in Fig. 1.
Figures 4, 5:
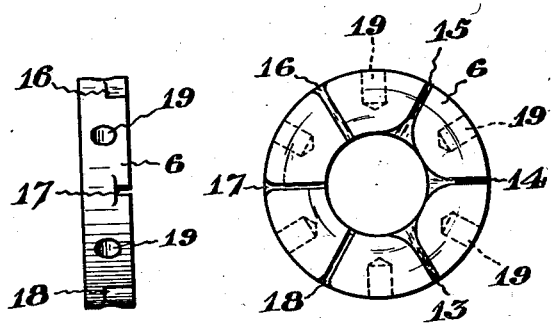
Fig. 4 is a front view of the die member removed from the assembled die head in which it is carried.
Fig. 5 is an edge view of the die member shown in Fig. 4.
Figure 3:
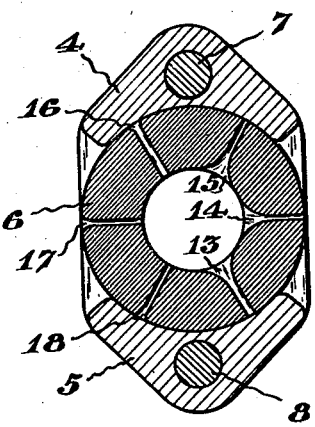
Fig. 3 is a transverse, sectional view of the die shown in Fig. 1 taken substantially on line 3—3 thereof and looking in the direction of the arrows.

The extruding die shown in the accompanying drawings embodies a die head 1 that is suitably threaded into the delivery head 2 of an extruding machine. The die head 1, which is shown in sectional view in Fig. 3, has a pair of laterally spaced shoes 4 and 5 that receive the cylindrical die member 6 therebetween. The inner face of the shoes are of concentric arcuate form and are of sufficient width to close openings in the die member that are in the inoperative positions. The die head 1 also has a pair of spaced bolts 7 and 8 that secure a head plate 9 in place. The head plate 9 has a recess 10 formed on its inner face for receiving a hardened steel follower plate 11 and is also threaded to receive a suitable nipple 12 through which the overflow from the extruding machine 2 is discharged. The size of the nipple 12 is controlled by the quantity of rubber composition or other plastic material that is carried away by the wire being insulated as it is drawn through the die.

The die 6 is of cylindrical form and it has a series of die openings 13, 14 and 15 of different sizes formed in one lateral face and corresponding entrance grooves 16, 17 and 18 formed in respective alignment therewith in the other side of the die. The die head 6 is formed of hardened steel in order that it will resist wear and each of the grooves 16, 17 and 18 has its peripheral openings slightly enlarged to prevent cutting of the wire that is fed therethrough, whereas each of the insulating die channels 13, 14 and 15 has an enlarged mouth for crowding the insulating material into intimate contact with the wire being covered.

The die also has a series of tool sockets 19 formed in its peripheral face by means of which the die is rotated to different positions to bring different sets of the die grooves into operative position. The outer periphery of the die head closely fits within the side walls of the shoes 4 and 5 of the die head. This serves to close those die openings that are not in the operative position, namely pairs of openings 16—13 and 18—15 in the position shown in Fig. 3. The openings 17—14 of the die head 6 are shown in their operative position in Fig. 3. The rubber compound passing through the machine enters the die openings 13—16, 15—18 and substantially seals and automatically seals these openings in the position shown.

The follower plate 11 is also formed of hardened steel in order that it will resist wear.

Figures 6, 7:
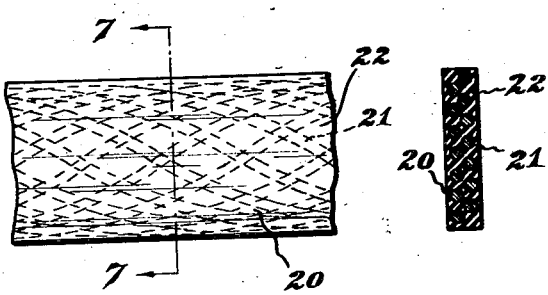
Fig. 6 is an enlarged plan view of a strip of insulated braided wire that has been passed through the die head shown in Fig. 1.
Fig. 7 is a transverse, sectional view of the strip of insulated wire shown in Fig. 6, the view in Fig. 7 being taken substantially on line 7—7 thereof.

Figs. 6 and 7 show a braided wire cable 20 that has its outer strands 21 embedded in rubber insulating compound 22 that is placed on the cable by passing the same through the die head previously described. The braided strands 21 are first threaded through the die channels 17—14 and arranged to be drawn through the die head diametrically thereacross from the channel 17 to the forming die opening 14. The head plate and cap of the machine are then securely clamped in place by drawing up the clamping nuts 23 one of which is mounted on each of the bolts 7 and 8. The extruding machine is started after the die head is clamped in place and the braided cable is drawn through the opening 17—14 in the die head. The rubber composition from the extruding machine is formed about the braided wire cable as shown in Figs. 6 and 7 by this method.

If it is desired that a different size of die opening be used with the braided cable or wire being insulated, the extruding machine is closed down and the head plate removed. The wire is laterally withdrawn from the die plate and is then turned a sufficient degree to bring the proper die opening into operative position. The wire to be insulated is then threaded through the openings in the side of the die plate and the clamping nuts 23 drawn tightly up to pull the die plate into clamped operative position. The machine is then again started up. The change is quickly made without cutting the wire and with the cleaning of only the channel for the wire instead of the cleaning of the entire die head as has heretofore been necessary.

It will be obvious to those skilled in the art that the principles of this invention may be embodied in other ie units of different structure without departing from the spirit and scope of this invention. It is desired, therefore, that the invention be limited only by such limitations as are imposed by the prior art.

What I claim is:

1. A die for covering strip material embodying an annular die block having entrance and exit apertures formed therein.

2. A die for covering strip material with plastic compound comprising an annular die unit having channels for receiving the strip material extending diametrically thereacross in combination with a head adapted to feed plastic material to the die unit under considerable pressure.

3. An insulating die comprising a die head having a pair of spaced shoes, a die having entrance and delivery channels for receiving strip material extending diametrically thereacross said die head having a pair of spaced shoes positioned on opposite sides of the die and having faces adapted to closely engage the corresponding face of the die, and a head plate adapted to secure the die in rigid relation with respect to the head.

4. A unit for forming plastic material about strip material that is fed therethrough comprising a die head having a die seat formed in the face thereof, openings at opposite sides of said die seat for permitting the entrance and exit of strip material fed through the die, a die having a plurality of pairs of die channels extending diametrically therethrough, and a central opening therein for applying plastic material to said strip material, and a cover plate for binding said die in position on said die head.

5. A unit for forming plastic material about strip material that is fed therethrough comprising a die head having a die seat formed in the face thereof, openings at opposite sides of said die seat for permitting the entrance and exit of strip material fed through the die, a die having a plurality of pairs of die channels extending diametrically therethrough, a central opening therein for applying plastic material to said strip material, a cover plate for binding said die in position on said die head, and providing an overflow for the plastic material.

6. A single piece die having entrance and exit formed in one lateral face thereof and a plastic material receiving aperture extending through the center of said die.

In testimony whereof I affix my signature.

ISIDORE J. REMARK.